March 12, 1968     W. A. PFAFF     3,372,617
PHOTOGRAPHING AND DEVELOPING APPARATUS
Filed July 15, 1965     4 Sheets-Sheet 1

INVENTOR
William A. Pfaff

BY Olive H. Bramson

ATTORNEY

INVENTOR
William A. Pfaff

March 12, 1968 W. A. PFAFF 3,372,617
PHOTOGRAPHING AND DEVELOPING APPARATUS
Filed July 15, 1965 4 Sheets-Sheet 4

INVENTOR
William A. Pfaff
BY Clive H. Bramson
ATTORNEY

United States Patent Office 3,372,617
Patented Mar. 12, 1968

3,372,617
PHOTOGRAPHING AND DEVELOPING
APPARATUS
William A. Pfaff, 12 Mary's Lane,
Centerport, N.Y. 11721
Filed July 15, 1965, Ser. No. 472,275
10 Claims. (Cl. 88—24)

This invention relates to the photographic reproduction of documents and more particularly to the provision of apparatus capable of photographing and developing the document-image upon low sensitivity photosensitive photographic materials.

Although the apparatus herein shown and described preferably includes an utlraviolet radiant energy-emitting source, it will be appreciated that the utilization of lamps capable of emitting other forms of radiant energy are contemplated as well. Therefore, silver halide type photographic materials, e.g., which undergo photochemical changes upon exposure to ordinary levels of visible light may be employed, the present apparatus, however, being directed essentially to the use of Kalvar photographic materials which are based upon the phenomenon of light-scattering regions which reflect and refract light, these regions being formed upon the decomposition of an ultra-violet radiation-sensitive compound which is applied as a coating upon either a transparent backing material or upon an opaque black paper. Diazo type photographic materials, it will be understood, which are similarly sensitive to ultraviolet radiation, may be utilized in the present apparatus, development thereof, however, being effectuated by ammonia vapor rather than by heat as described herein with respect to the preferred Kalvar material.

More specifically, the ultraviolet sensitive compound coating the photographic material or film is uniformly dispersed within a thermoplastic resin. Upon exposure to ultraviolet radiation, the compound is decomposed to form a gas. Upon the application of heat, the decomposition products expand to form microscopic vesicles which are of a different index of refraction than the surrounding medium to thereby scatter light incident upon them to thus constitute the image.

The character of the film requires that the temperature thereof during exposure should not exceed 110° F., inasmuch as higher temperatures will result in premature development and a much higher rate of diffusion of the image-forming gas so that the density and resolution obtained will be reduced. Development of Kalvar film is, however, accomplished by the application of heat thereto subsequent to the exposure thereof to ultraviolet or near ultraviolet radiation.

In consonance with the foregoing, the present invention, which is primarily directed to the photographing of documents, discloses cooling means for dissipating the heat generated by the radiant energy source during exposure and further includes heating means for rapidly developing the film following the exposure thereof.

Accordingly, an object of the invention resides in the provision of a photographic apparatus wherein a flow of mechanically convected air is used to cool the lamps emitting the radiation, said air flow being further utilized to the ends of retaining the document or copy being reproduced in stationary relation with respect to a supporting platform, and removing heat from the document.

Another object of the instant invention is to provide an apparatus of the described character including an electrically heated developing platen adapted to contact only the exposed frame of a roll or film immediately following the exposure period.

Another object of the invention resides in the provision of a movable platen which is capable of applying heat to a single frame immediately following exposure without prematurely heating the frame before or during exposure.

A further object of the present invention resides in the provision of photographic apparatus having means affording improved image resolution notwithstanding the utilization of a high speed lens.

A still further object of this invention is to provide a device in accordance with the foregoing which includes light intensification means whereby stray lamp-emitted radiant energy is reflected and directed to the document being copied.

Another object of the present invention resides in the provision of a photographing and developing device including means for improving the uniformity of light distribution on the copy, for redirecting reflected light back to the copy and for preclusion of the reflection of light from the copy to the lens during the exposure period.

Still another object of the invention resides in the provision of a device of the foregoing character including means for maintaining the film in a taut attitude both during the exposure and development operations.

Another general object of the present invention is to provide a device of the described character which is relatively simple in structure, economical of manufacture, and highly effective in use.

Other objects and advantages of the instant photographing and developing apparatus will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate the preferred embodiment of the invention, and together with the description, serve to explain the principles of the invention.

Figures 1, 5, 8:
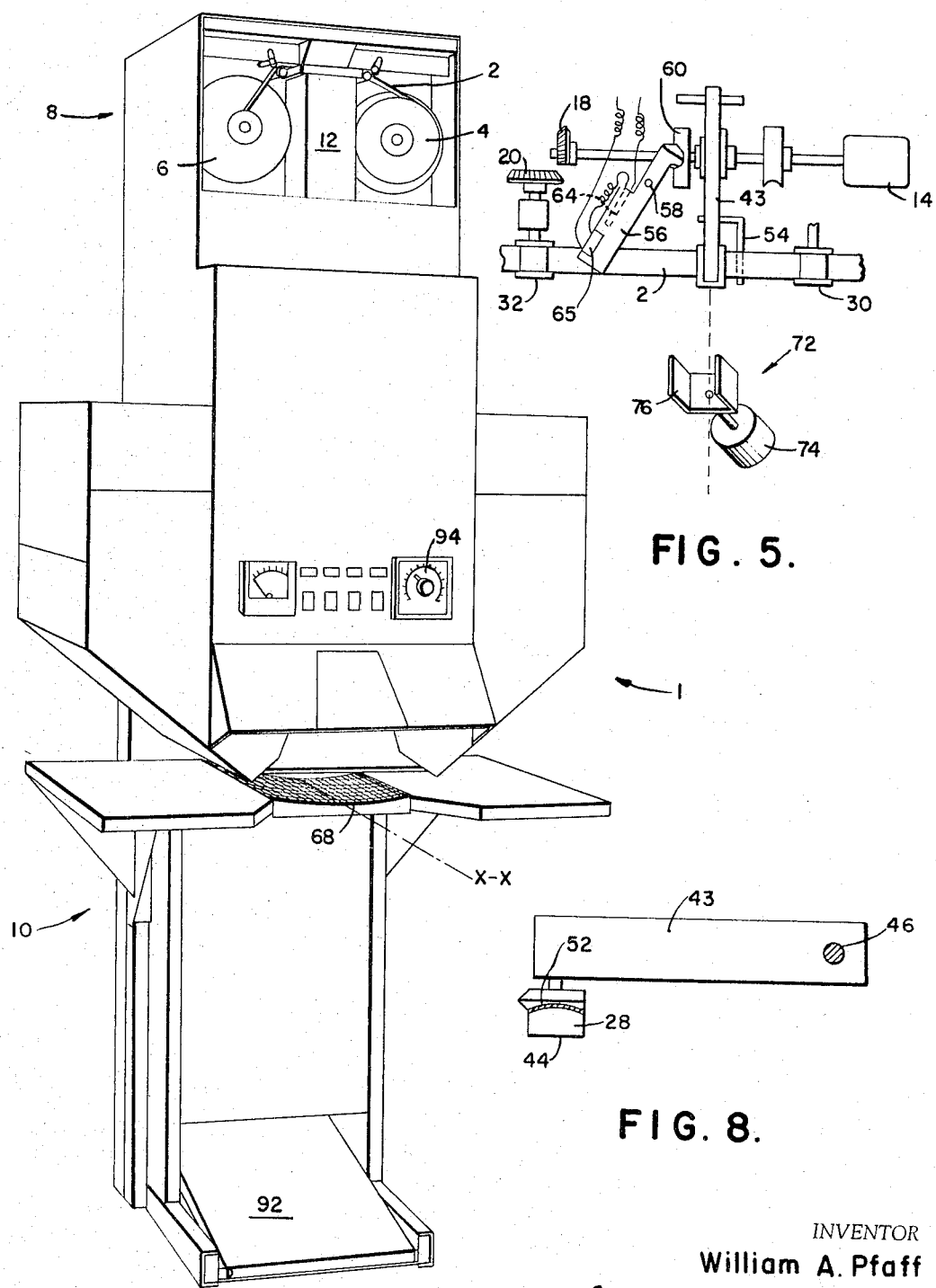
FIGURE 1 is a perspective view of the photographing and developing apparatus, the film feed and take-up reels being shown.
FIGURE 5 is a fragmentary detail of the heater platen and the pressure shoe, the gear arrangement and driving means being included.
FIGURE 8 is a detail view showing a section of film secured over the film-framing aperture.

Referring now in detail to the present preferred embodiment of the invention illustrated in the accompanying drawings, FIGURE 1 shows the microfilming apparatus designated generally by numeral 1 including a supply of film 2 of the aforedescribed nature wound on feed and take-up reels 4 and 6, respectively.

The apparatus, it will be observed, is formed of upper and lower portions, designated generally by numerals 8 and 10, respectively, said upper portion housing a camera lens system 12 and said feed and take-up reels 4 and 6, said lower portion 10 being adapted to support the document to be copied and the apparatus itself upon a floor or table surface.

Figure 3:
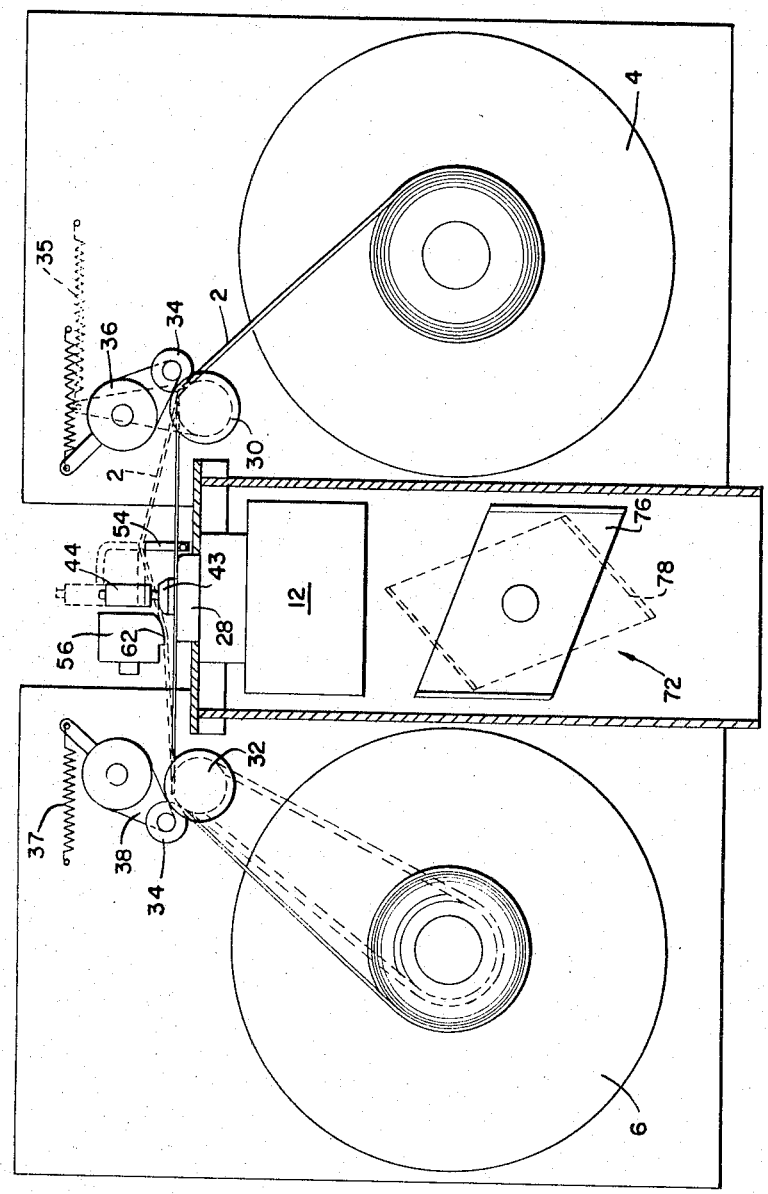
FIGURE 3 is an enlarged detail front view of the film guide rollers, and the feed and take-up reels, the lens system and rotary barrel shutter being interposed therebetween.
Figure 4:
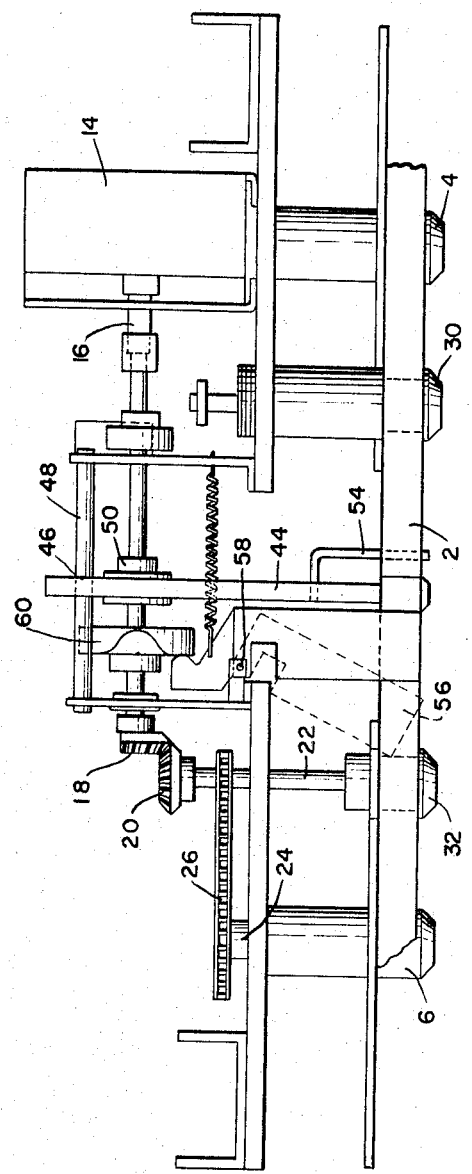
FIGURE 4 is an enlarged detail front view of the film support and guide assembly illustrated in FIGURE 3, the movable nature of the developing heater platen being shown therein.

With further reference to FIGURES 3–5 of the drawings, wherein the detailed structure of the instant apparatus is more particularly illustrated, it will be seen that electrically driven motor 14 is drivingly connected to take-up reel 6 through drive shaft 16 which includes partial bevel gear 18 at the free end thereof, the latter being arranged in meshing engagement with bevel gear 20, the shaft 22 connected thereto being then connected to shaft 24 through continuous chain belt 26 as shown.

Figure 7:
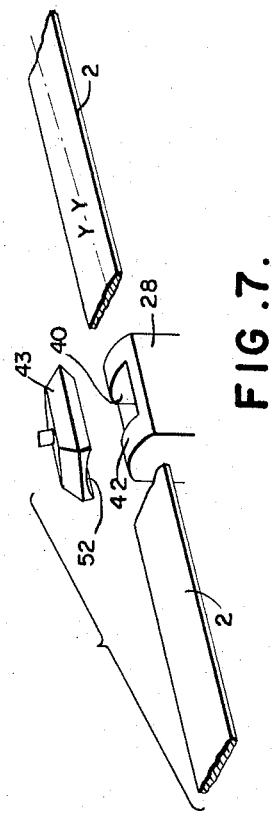
FIGURE 7 is an enlarged perspective view of the pressure shoe and the base member including the film-framing aperture, the curved nature thereof being shown.
Figure 6:
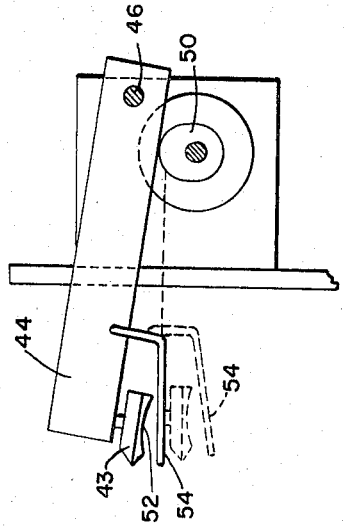
FIGURE 6 is a side elevation of the pressure shoe and the lift actuating cam in association therewith.

Film supporting base member 28 is mounted between said feed and take-up reels and is in spaced relation therewith, film 2 being guided into position over said base member by drag roller 30 and film advance roller 32, the latter having a one-way clutch housed therein. As illustrated in FIGURE 7, said base member 28 is provided with film-framing aperture 40, the surface 42 of said base member being convex in character as shown.

Film 2, after having been raised for effectuating the developing operation to be described hereinbelow, becomes slack once lift-arm 54 is lowered. The film, however, is pulled taut by the action of spring 35 which through crank arm 36 functions to turn drag roller 30 clockwise to thereby take up the slack in film 2 previously caused by the lifting action of lift-arm 54. A slip-clutch on the shaft-supporting roller 32 restrains movement of the film from said roller in the direction of roller 30, spring 37 acting through member 38 to urge pressure roller 34 against said film advance roller 32.

Pressure shoe member 43 is loosely connected to pressure arm 44 which is pivotally mounted at 46 about support rod 48 for vertical movement above base member 28, said shoe member being adapted to pressingly contact said base member. To that end lift cam 50 provides means for urging said shoe member away from and against said base member whereby when said members are in pressing relation as shown in FIGURE 3, e.g., the film passing therebetween is held securely and contiguously with respect to said base member.

With reference again to FIGURE 7, it will be noted that surface 52 of said pressure shoe member is concave in character, or of opposed but complementary curvature to that of surface 42, described hereinabove. Accordingly, when said members are in pressing relation, the film passing therebetween will be curved about its longitudinal axis to provide a downwardly facing concave-shaped section of film secured between said members as shown in FIGURE 8 of the drawings.

Film lift-arm 54 extends integrally of and slopes downwardly and laterally with respect to said shoe member, the film being arranged to pass over said lift-arm and beneath said shoe member.

Developing heater platen 56 is pivotally mounted about pin 58 for horizontal movement adjacently of said shoe member. Positioning means comprised of heater moving cam 60 is capable, upon rotating responsively to driving motor 14, of moving said platen into perpendicularity with respect to said film as shown in solid line in FIGURE 4, the film as shown being arranged to pass beneath said platen. Upon movement of shoe member 44 away from base member 28, lift-arm 54 will raise film 2 into pressing contact with the lower surface 62 of platen 56, the latter which is heated electrically by resistance element 64 being utilized for developing the exposed film. Thermostat 65 is provided within platen 56 to regulate the temperature thereof.

Figure 2:
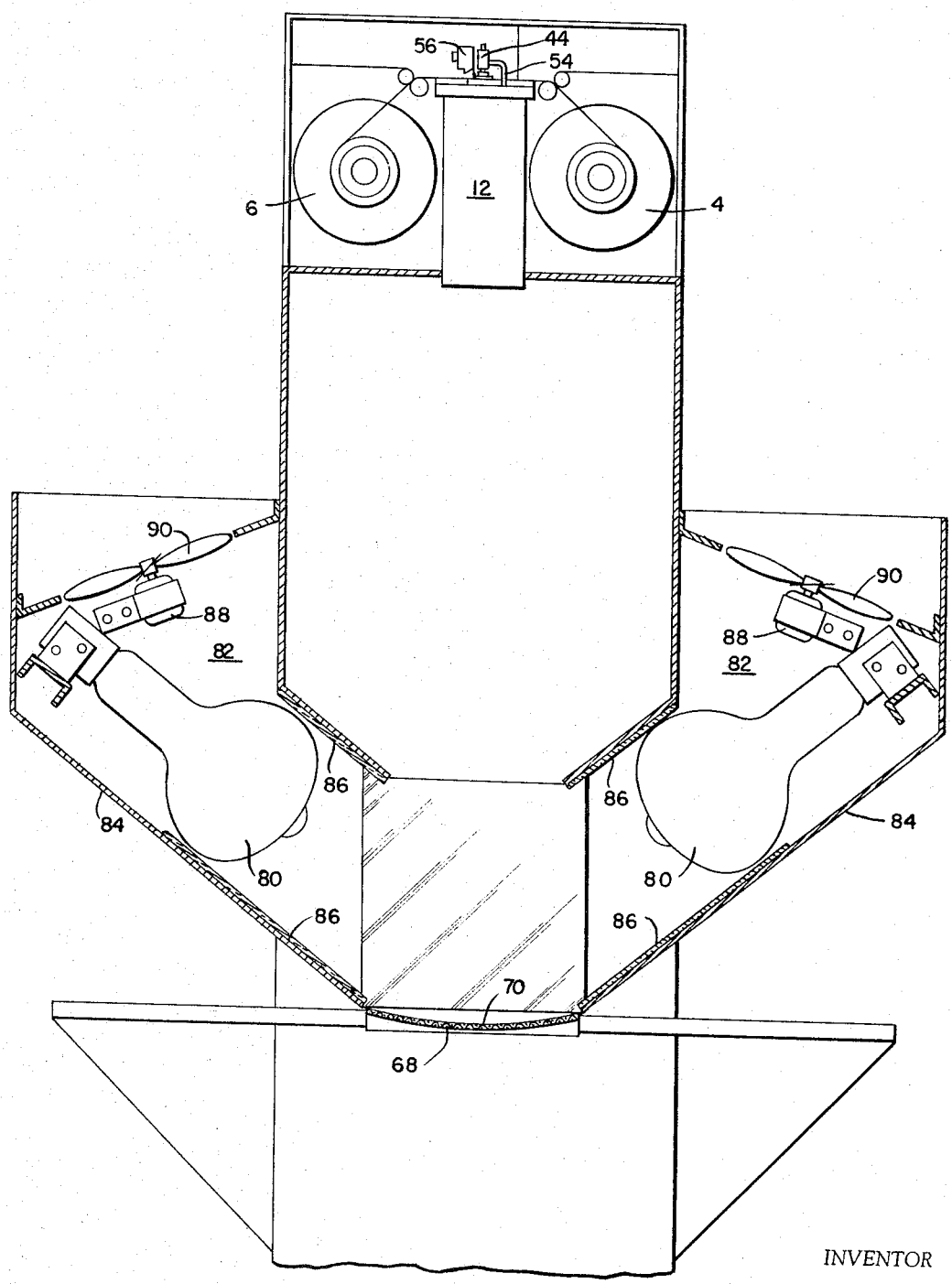
FIGURE 2 is a cross-sectional front elevational view of the device illustrating the radiant energy-emitting lamps, the cooling and reflecting means associated therewith and the nature of the document support platform.

Camera lens system 12 is mounted beneath said film-framing aperture 40 and in vertical alignment therewith, document support platform 68 being mounted beneath said lens system within the lower portion of the apparatus and therefore in spaced relation with respect to said lens system. As shown in FIGURES 1 and 2, said document support platform provides an upwardly facing concave-shaped surface 70, axis X—X thereof, about which said surface is curved, being perpendicular with respect to the longitudinal axis Y—Y of said film passing between said shoe and base members. Thereby, the object being copied is curved to the natural field of the lens system to thus accomplish better resolution. The platform is formed of finely meshed screen material having openings therethrough extending from the obverse to the reverse surfaces thereof.

The rotary barrel shutter 72, driven by rotary solenoid 74 is mounted intermediate said lens system and said support platform and is in alignment therewith whereby when in position 76 the document-image will fall upon the film portion being exposed, and when in position 78 said image will be blocked.

The radiant energy source is preferably comprised of mercury vapor lamps 80 mounted adjacently said support platform within housings 82. The housings include inclined wall conduit sections 84 which are covered internally with light-reflecting mirror elements 86, the latter being effective in reflecting stray energy from the lamps, directing said energy upon the document being copied to thereby increase the light striking said document during the exposure period. Although one lamp is visible within each conduit section 84 in the view shown in FIGURE 2 of the drawings, it will be appreciated that the lamps are mounted in pairs, two within each conduit section. The number of lamps, however, may be varied without sacrificing any advantages of the invention.

Mechanical convection means or forced air blowers comprised of electric motors 88 and impeller blades 90 which are mounted within housings 82 and adjacent said lamps, function to provide a forced air flow over said lamps to effectuate cooling thereof and further direct a flow of air downwardly over said document support platform to thereby remove heat therefrom. It will be appreciated that the document when positioned upon the curved support platform 68, will assume the shape thereof and will be held firmly thereagainst by virtue of the streams of air directed thereon and by reason of the porosity of the platform which allows the air to flow therethrough.

Having described the structure of the photographing and developing apparatus, the operation thereof is as follows:

The document or copy to be photographed is placed upon the document support platform 68. The lamps 80 are switched on and are permitted to remain energized as required, that is, at least throughout the exposure period. The film frame to be exposed is positioned over base member 44 by dint of the previous exposure and development cycle. Depression of foot peddle 92 activates timer member 94 which has been pre-set for the desired period of exposure, rotary shutter 72 being automatically rotated to position 76 for this time period (usually about 15 seconds). At the conclusion of the time period during which the film frame has been exposed, the rotary shutter resumes position 78 and motor 14 is activated to rotate shaft 16 one revolution. Rotation of double cam 50 to a first position partially raises pressure arm 44 to permit film 2 to advance one frame; developing platen 56 being at this time pivoted horizontally into normal relation with said film. Cam 50 then rotates to a second position to further raise pressure arm 44 whereby lift-arm 54, which moves upwardly with said pressure arm, raises film 2 into contact with developing platen 56. The exposed frame, by reason of its contact with the heated platen, is developed, the next frame, ready for exposure having been moved into position above the base member. Once shaft 16 has rotated through the complete revolution, pressure arm 44 will return to its downward position to pressingly secure the next framed section of film between the pressure shoe and base members.

It will be understood that any of the known sizes of film may be employed with the aforedescribed apparatus, 16 mm. and 35 mm. sizes being most frequently contemplated and utilized. Exposures may be made adjacently on the same film strip or exposures may be individually mounted, as for example, on aperture cards wherein the exposed film is framed.

Although the preferred embodiment of the photographing and developing apparatus has been described, it will be understood that within the purview of this invention various changes may be made in the forms, details, proportion and arrangement of parts, the combination thereof and mode of operation, which generally stated consists in a device capable of carrying out the objects set forth as disclosed and defined in the appended claims.

What is claimed is:

1. In a photographing and developing apparatus having an upper portion housing a camera lens system, film feed and take-up reels, and a lower portion for supporting a document to be photographed, the combination comprised of said feed and take-up reels, driving means connected to one of said reels, a film supporting base member mounted between said reels and in spaced relation therewith, said base member having a film-framing aperture therethrough, a pressure shoe member pivotally mounted for vertical movement above said base member, said shoe member being adapted to pressingly contact said base member, and means for urging said shoe member away from and against said base member whereby when said members are in pressing relation the film passing therebetween will be held securely and contiguously with respect to said base member, a film lift-arm extending integrally and laterally of said shoe member, the film being arranged to pass over said lift-arm and beneath said shoe member, a heatable developing platen pivotally mounted for horizontal movement adjacently of said shoe member, means for positioning said platen into normal relation with respect to said film, the latter being arranged to pass beneath said platen, said film being raised into pressing contact with respect to said platen upon movement of said shoe member away from said base member, said camera lens system being mounted beneath said film-framing aperture and in alignment therewith, a document support platform mounted beneath said lens system, and spaced with respect thereto, a rotary barrel shutter mounted intermediate said lens system and said support platform, a radiant energy source mounted adjacently of said support platform, and mechanical convection means mounted adjacent said radiant energy source, said convection means being adapted to provide a force air flow over said radiant energy source and downwardly upon said document support platform.

2. In a photographing and developing apparatus as set forth in claim 1 wherein the surface of said film supporting base member adapted to contact the film is convex in character and the surface of said pressure shoe member adapted to contact the film is concave in character whereby when said members are in contacting relation, the film passing therebetween will be curved about its longitudinal axis to provide a downwardly facing concave-shaped film surface secured between said members.

3. In a photographic and developing apparatus as set forth in claim 2 wherein said document support platform comprises an upwardly facing concave-shaped screen, the axis thereof about which said screen is curved, being perpendicular with respect to said longitudinal film axis.

4. In a photographing and developing apparatus as set forth in claim 1 wherein light-reflecting elements are provided adjacently of said radiant energy source.

5. In a photographing and developing apparatus as set forth in claim 1 wherein the radiant energy emitted from said radiant energy source is within the range of ultraviolet to near ultraviolet.

6. In a photographing and developing apparatus having an upper portion housing a camera lens system, film feed and take-up reels, and a lower portion for supporting a document to be photographed, the combination comprised of said feed and take-up reels, driving means connected to one of said reels, a film supporting base member mounted between said reels and in spaced relation therewith, said base member having a film-framing aperture therethrough, a pressure shoe member mounted for vertical movement above said base member, said shoe member being adapted to pressingly contact said base member, and means for urging said shoe member away from or against said base member whereby when said members are in contacting relation the film passing therebetween will be held securely and contiguously with respect to said base member, a film lift-arm arranged to move vertically with said shoe member, the film being arranged to pass over said lift-arm and beneath said shoe member, a developing platen mounted for movement adjacently of said shoe member, means for positioning said platen into normal relation with respect to said film, the latter being arranged to pass beneath said platen, said film being raised into pressing contact with respect to said platen upon movement of said shoe member away from said base member.

7. Apparatus for microfilming documents, comprising in combination, a camera lens system, film feed and take-up reels, film developing means, a document support platform in alignment with said lens system, a radiant energy-emitting source, and mechanical convection means for directing a flow of air over said radiant energy-emitting source and downwardly upon said document support platform, photosensitive film being movable from said feed to said take-up reel, said film being arranged to pass behind said lens system for exposure and thereafter to pass spacedly beneath said film developing means, and lift means adapted to raise a portion of said film into contact with said film developing means subsequent to exposure of said portion of the film.

8. The apparatus as set forth in claim 7 wherein said film is coated with an ultraviolet radiation sensitive compound.

9. The apparatus as set forth in claim 8 wherein the radiant energy source emits ultraviolet or near ultraviolet radiation.

10. All the improvements and features, singly and in combination, which are disclosed in the specifications, claims and drawings.

References Cited

UNITED STATES PATENTS

| 2,582,001 | 1/1952 | Bornemann et al. | |
| 3,143,944 | 8/1964 | Takats | 88—24 X |
| 3,282,153 | 11/1966 | Chen et al. | 88—24 |

NORTON ANSHER, *Primary Examiner.*

R. A. WINTERCORN, *Assistant Examiner.*